United States Patent
Little

(10) Patent No.: US 9,038,125 B2
(45) Date of Patent: May 19, 2015

(54) SELF IDENTIFYING SERVICES IN DISTRIBUTED COMPUTING

(75) Inventor: Mark Cameron Little, Ebchester (GB)

(73) Assignee: Red Hat, Inc., Raleigh, NC (US)

(*) Notice: Subject to any disclaimer, the term of this patent is extended or adjusted under 35 U.S.C. 154(b) by 1280 days.

(21) Appl. No.: 11/895,431

(22) Filed: Aug. 24, 2007

(65) Prior Publication Data
US 2009/0055888 A1  Feb. 26, 2009

(51) Int. Cl.
*H04L 29/06* (2006.01)
*H04L 29/08* (2006.01)

(52) U.S. Cl.
CPC ............. *H04L 63/20* (2013.01); *H04L 67/16* (2013.01)

(58) Field of Classification Search
CPC ........................................................ H04L 67/16
USPC ............................................................ 726/1, 6
See application file for complete search history.

(56) References Cited

U.S. PATENT DOCUMENTS

| | | | |
|---|---|---|---|
| 6,298,445 B1* | 10/2001 | Shostack et al. | 726/25 |
| 6,580,916 B1* | 6/2003 | Weisshaar et al. | 455/456.1 |
| 6,785,820 B1* | 8/2004 | Muttik et al. | 726/24 |
| 7,020,688 B2* | 3/2006 | Sykes, Jr. | 709/206 |
| 7,036,020 B2* | 4/2006 | Thibadeau | 713/193 |
| 7,139,811 B2* | 11/2006 | Lev Ran et al. | 709/217 |
| 7,395,333 B1* | 7/2008 | Saulpaugh et al. | 709/225 |
| 7,606,818 B2* | 10/2009 | Bachmann et al. | 1/1 |
| 7,606,918 B2* | 10/2009 | Holzman et al. | 709/229 |
| 8,055,775 B2* | 11/2011 | Channabasavaiah et al. | 709/226 |
| 2006/0212593 A1* | 9/2006 | Patrick et al. | 709/230 |
| 2007/0192111 A1* | 8/2007 | Chasen | 705/1 |
| 2008/0033845 A1* | 2/2008 | McBride et al. | 705/28 |
| 2008/0178081 A1* | 7/2008 | Reshef et al. | 715/700 |
| 2010/0057835 A1* | 3/2010 | Little | 709/203 |
| 2010/0242053 A1* | 9/2010 | Nitzsche et al. | 719/317 |

OTHER PUBLICATIONS

The Enterprise Service Bus: Making service oriented architecture real; IBM systems journal, vol. 44, No. 4, 2005.*
Service-Oriented Computing: Key Concepts and Principles; IEEE Internet Computing, ed. Michael N. Huhns and Munindar P. Singh, vol. 9, Issue 1, 2005, pp. 75-81.*
Vasudevan, Venu, "A Web Services Primer," XML.com, Published on XML.com http://www.xml.com/pub/a/ws/2001/04/04/webservices/index.html, May 30, 2007, http://webservices.xml.com/lpt/a/760, pp. 1-10.
"JBossESB Requirements and Architecture, Version: 0.3," May 2, 2006, pp. 1-12.
Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.

(Continued)

*Primary Examiner* — Luu Pham
*Assistant Examiner* — James Turchen
(74) *Attorney, Agent, or Firm* — Lowenstein Sandler LLP

(57) ABSTRACT

A service policy is modified for a service in a distributed computing environment having a service oriented architecture. A client is notified of the modified service policy without use of a service registry.

19 Claims, 5 Drawing Sheets

(56) References Cited

OTHER PUBLICATIONS

Hunt, John, "The Holy Grail of Services: SCA," Req Developer >> Code >> Java/J2EE, Original URL: http://www.regdeveloper.co.uk/2007/03/13/sca_for_soa/, http://www.regdeveloper.co.uk/2007/03/13/sca_for_soa/print.html, Mar. 14, 2007, pp. 1-6.

"Web Services Context Specification (WS-Context)," OASIS, Committee draft version 0.8, Version created Nov. 3, 2004, Editors, Mark Little, et al., Copyright © 2004 The Organization for the Advancement of Structured Information Standards [Appendix A], pp. 1-23.

"Web Service Endpoint Identification and Resolution: Use Cases and Requirements," Version 1.0, GWD-I (draft-ggf-wse-id-usecases-1.0-3), Open Grid Services Architecture Working Group, Editors: F. Siebenlist, ANL, et al., Apr. 21, 2006, ogsa-wg@ggf.org, pp. 1-16.

"Why ESB and SOA?" Version 0.3, Date: Jan. 27, 2006, pp. 1-7.

King, Erik, "Perpetual Enterprise Management Service (PEMS) for Next Generation SOA-based Command & Control Systems", Jun. 2005, 26 pages.

King, Erik, "Perpetual Enterprise Management Service (PEMS) for C2 SOA Deployments", Jun. 14, 2005, 23 pages.

* cited by examiner

SELF IDENTIFYING SERVICES IN DISTRIBUTED COMPUTING

TECHNICAL FIELD

Embodiments of the present invention relate to distributed systems, and more specifically to publishing service policies in a service oriented architecture.

BACKGROUND

In distributed computing systems having a service oriented architecture, services may be provided by multiple servers at various locations. For a client to utilize available services, the client must know an address of the service, and a policy of the service (including protocol and message format requirements). In conventional service oriented architectures, service addresses and service policies are maintained in a message registry along with service descriptions.

When a service policy changes (e.g., service capabilities change, message context requirements change, etc.), or a service address changes, the service registry must be updated before clients can successfully use the modified service. However, service registries are updated on a periodic basis. Therefore, there is a lag between when a service is updated (e.g., new service capabilities are added, existing service capabilities are removed, or service is moved), and when the updated service may be used by clients. Moreover, for some clients it may be burdensome to query the service registry for new service information when service capabilities are changed.

BRIEF DESCRIPTION OF THE DRAWINGS

The present invention is illustrated by way of example, and not by way of limitation, in the figures of the accompanying drawings and in which.

DETAILED DESCRIPTION

Figure 1:
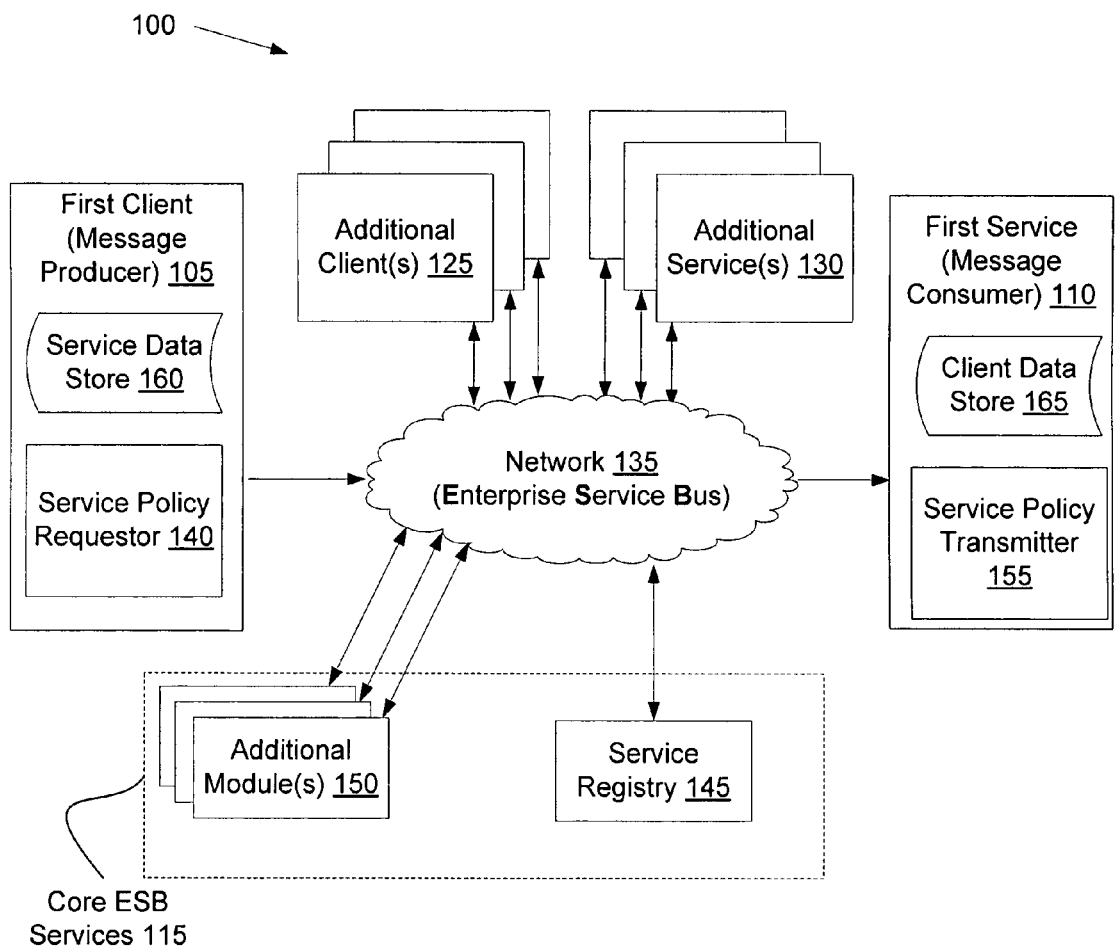
FIG. 1 illustrates an exemplary distributed system, in which embodiments of the present invention may operate.

Described herein is a method and apparatus for distributing service policies in a distributed computing system. In one embodiment, a service policy is modified for a service in a distributed computing environment having a service oriented architecture. The service oriented architecture may include an enterprise service bus. Modifying the service policy may include adding a new service capability and/or removing an existing service capability. A client may then be notified of the modified service policy without use of a service registry. Thus, the client may be up-to-date on service policies before a service registry is updated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "deleting", "storing", "determining", "notifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients (e.g., first client 105 and additional clients 125) and services (e.g., first service 110, additional services 130 and core ESB services 115), connected via a network 135. Each of the clients 105 and 125 and services 110, 115, 130 may be both message producers and message consumers, as described below.

The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services 110, 115, 130 and clients 105 and 125 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients 105 and 125 may be, for example, personal computers (PC), palm-sized computing devices, personal digital assistants (PDA), etc. Clients 105 and 125 may also be applications run on a PC, server, database, etc. In the SOA, clients 105 and 125 include applications that access services 110 and 130. Clients 105 and 125 maybe fat clients (clients that perform local processing and data storage), thin clients (clients that perform minimal or no local processing and minimal to no data storage), and/or hybrid clients (clients that perform local processing but little to no data storage).

In one embodiment, first client 105 includes a service policy requestor 140 and a service data store 160. Service data store 160 stores service policies and/or additional service information (e.g., service descriptions, service addresses, transaction information (e.g., messages sent and received), authentication information (e.g., login and password), etc.). A service policy is a set of conditions that must apply to use a service. The service policy may include message context requirements, message format requirements, rules on when messages will be received, etc. The service policy may also identify capabilities of the service (e.g., what actions service can perform and how to request specific actions, whether the service is secure, reliability characteristics, transactional characteristics, etc.), a service address or addresses, and/or additional service information (e.g., a functional service description). In one embodiment, service data store 160 records service policies and/or additional service information for services that have been used by first client 105 (e.g., services to which messages have been sent, or from which messages have been received). Alternatively, service data store 160 may maintain a local copy of the service registry 145.

Service policy requester 140 may request service policies and/or additional service information from services (e.g., first service 110 or additional services 130). In one embodiment, service policy requester 140 examines service data store 160 to determine whether it includes an entry for the service to which the request will be directed. In another embodiment, service policy requester 140 searches service repository 145 for information on the service. Once a service address for the service is determined, service policy requestor 140 sends a service policy request (e.g., a message formatted to request a service policy and/or additional service information) to the service address. The service may then respond with an up-to-date service policy (e.g., including a list of service capabilities, required message contents, service addresses, etc.). The up-to-date service policy may be stored in the service data store 160, and may replace any existing entries for the service. The up-to-date service policy may then be used to access the service.

In another embodiment, service policy requestor 140 may broadcast or multicast a service policy request on the ESB. Services that receive the request may respond with service policies and/or additional service information. The received service policies may then be stored in the service data store, and used to access services.

Services 110 and 130 may be discretely defined sets of contiguous and autonomous functionality (e.g., business functionality, technical functionality, etc.). Services 110 and 130 may be resident on personal computers (PC), servers, routers, etc. Each service 110 and 130 may represent a process, activity or other resource that can be accessed and used by other services or clients on network 135. Each service 110 and 130 may be independent of other services 110 and 130, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

In one embodiment, first service 110 includes a service policy transmitter 155 and a client data store 165. Client data store 165 may store client information on clients that have used (accessed) service capabilities of first service 110. Client data store 165 may include client addresses (e.g., IP addresses), transaction histories, and/or authentication information.

In one embodiment, service policy transmitter 155 transmits a service policy of first service 110 and/or additional information in response to receiving a request for the service policy (e.g., from first client 105). In another embodiment, when a service policy is changed and/or a service address is changed, service policy transmitter 155 transmits the updated service policy and/or additional service information (e.g., updated service address) to clients having entries in the client data store 165 (e.g., clients that previously used first service 110). Clients may indicate that they do not wish to be notified of updated service policies, in which no service policy update would be sent to them. In yet another embodiment, service policy transmitter 155 may broadcast or multicast service policies and/or additional service information through the ESB when a service policy of first service 110 is changed.

Service policy transmitter 155 may also send the updated service policy to service registry 145.

In one embodiment, the distributed computing system 100 includes an ESB that has a collection of core ESB services 115. The core ESB services 115 act on messages that flow through the ESB. Messages can also be directed towards any of the core ESB services 115. Any of the core ESB services 115 may include one or more general purpose computing devices (e.g., personal computer or server) and/or a special purpose computing devices configured to act on messages that flow between message producers (e.g., clients or services) and message consumers (e.g., clients or services) within the ESB.

In one embodiment, the core ESB services 115 include a service registry 145. The service registry 145 includes information on some or all services of the ESB. In one embodiment, the service registry 145 includes multiple service entries, each of which includes a service policy and/or additional service information for a single service or set of services. A service entry may include a service description, service policy (e.g., message context requirements (e.g., custom fields or filters, transactional information, security information, etc. that are to be used when sending messages to the service), service capabilities, etc.) and a service address (e.g., a host number and a port number for services using HTTP or FTP, a JMS queue name for services using JMS, etc.). A service entry may also include an indication of whether the service is a self identifying service. Self identifying services are services that can transmit a service policy to clients (e.g., upon modifying the service policy, or upon client request). A client 105, 125 may then know to send a service policy request to the service 110, 130.

A client 105, 125 may search the service registry 145 to determine what services are available on the ESB. This may be performed by sending a message to the service registry 145 requesting information on one or more services, types of services, etc. The client 105, 125 may perform a search by using a search query, or by browsing the service registry. Once an appropriate service has been identified, the client 105, 125 may send a message to the service 110, 130 in accordance with the service policy (e.g., with a specific message format, message context, etc.).

For a service 110, 130 to be included in the service registry 145, that service may send a message to the service registry 145 that includes the service policy (e.g., required message context, message format, description, etc.) and/or additional service information (e.g., service description, service address, etc.). Services 110, 130 on the ESB may occasionally be modified. Such modifications may include adding new service capabilities, removing existing service capabilities, modifying existing service capabilities, changing a service address, etc. A service may notify the service registry 145 of the update/modification by posting an updated service policy and/or other service information. When the service registry 145 is next updated, the updated/modified service policy will be reflected in the service registry 145.

The core ESB services 115 may include one or more additional modules 150, each of which may be a service of the ESB. Examples of additional modules 150 include modules that provide services for redirecting a message from an original intended endpoint, splitting a message into multiple messages, combining multiple messages into a single message, transforming messages from a first format to a second format, applying rules to a message, storing copies of messages, etc. Each additional module 150 may provide a service to clients 105 and 125 and/or services 110 and 130 of the distributed computing system 100.

Figure 2:
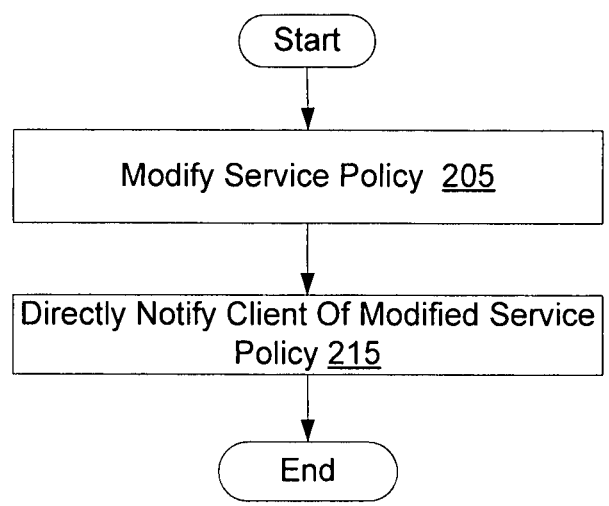
FIG. 2 illustrates a flow diagram of one embodiment for a method of notifying clients of updated service policies and/or additional service information in a distributed computing system.

FIG. 2 illustrates a flow diagram of one embodiment for a method 200 of notifying clients of updated service policies and/or additional service information in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 200 is performed by one or more services of distributed computing system 100 of FIG. 1.

Referring to FIG. 2, method 200 includes modifying a policy of a service (block 205). The service may be a process, activity or other resource that can be accessed and used by other services or clients in a distributed computing environment. The service may include a service address and one or more service capabilities. The service may also include a service policy that mandates specific message formats, message context, etc. Modifying the service policy may include adding a new service capability and/or removing an existing service capability. Furthermore, modifying the service policy may include modifying message context requirements, a service address or service addresses, or other service information and/or requirements.

At block 215, one or more clients are notified of the modified service policy. In one embodiment, previous clients are directly notified (e.g., messages that include the updated service policy are sent directly to clients). In another embodiment, clients that send a service policy request to the service are directly notified. In yet another embodiment, a modified service policy is broadcast or multicast over an ESB on which the service resides. Thus, a service policy and/or additional service information may be pushed to a client, or pulled from the service, directly and without use of a service registry.

Figure 3:
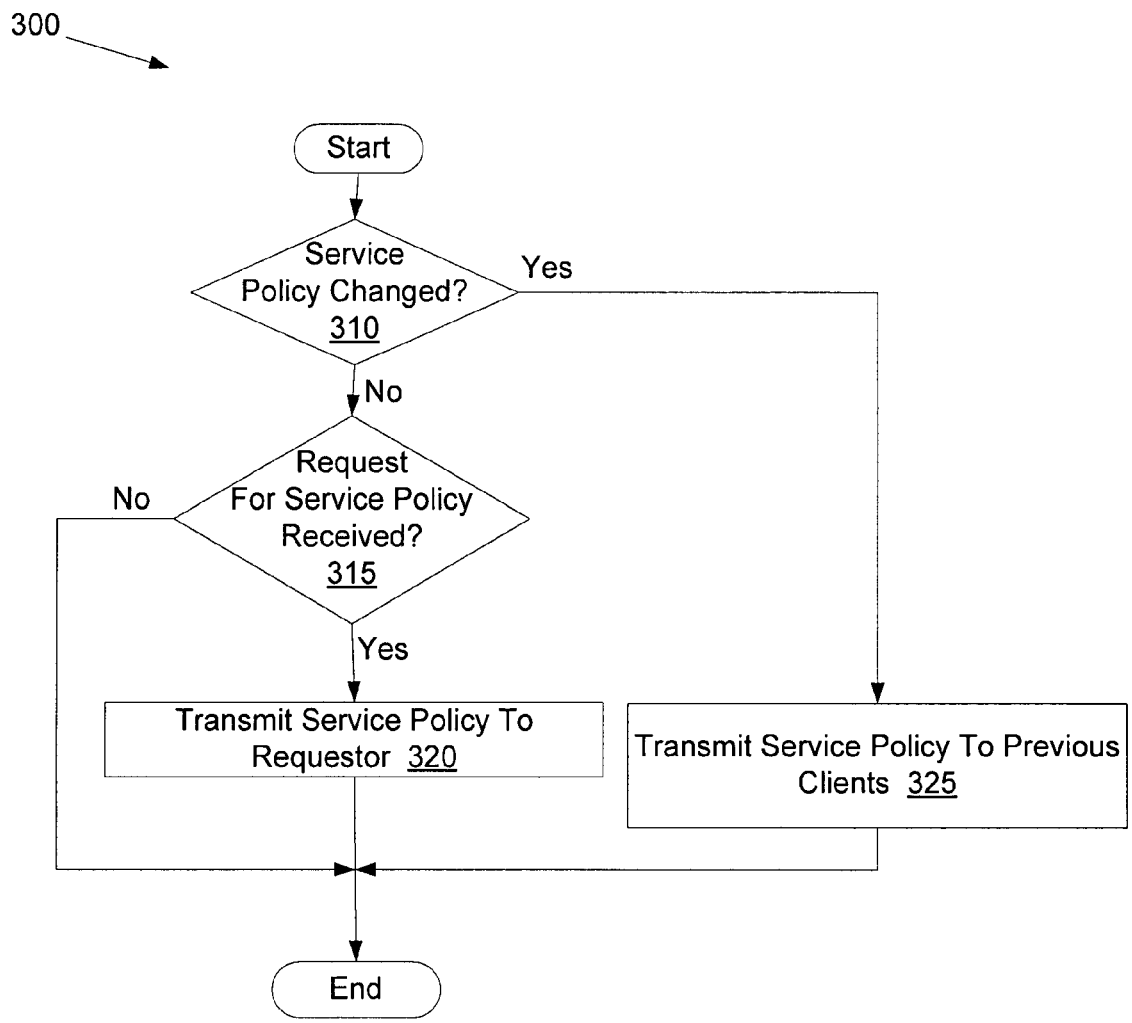
FIG. 3 illustrates a flow diagram of another embodiment for a method of notifying clients of updated service policies and/or additional service information in a distributed computing system.

FIG. 3 illustrates a flow diagram of another embodiment for a method 300 of notifying clients of updated service policies and/or additional service information in a distributed computing system. The method may be performed by processing logic that may comprise hardware (e.g., circuitry, dedicated logic, programmable logic, microcode, etc.), software (such as instructions run on a processing device), or a combination thereof. In one embodiment, method 300 is performed by one or more services of distributed computing system 100 of FIG. 1.

Referring to FIG. 3, method 300 includes determining whether a service policy has changed (block 310). The service policy may have changed if new service capabilities have been added, existing service capabilities have been removed, service addresses have been changed, message context requirements have been changed, etc. If the service policy has changed, the method proceeds to block 325, and a modified service policy is transmitted to previous clients. If the service policy has not changed, the method proceeds to block 315.

At block 315, processing logic determines whether a request for a service policy has been received. If a request for a service policy has been received, the method proceeds to block 320, and a current service policy is transmitted to the requester. If no request for service policy is received, the method ends.

Figure 4:
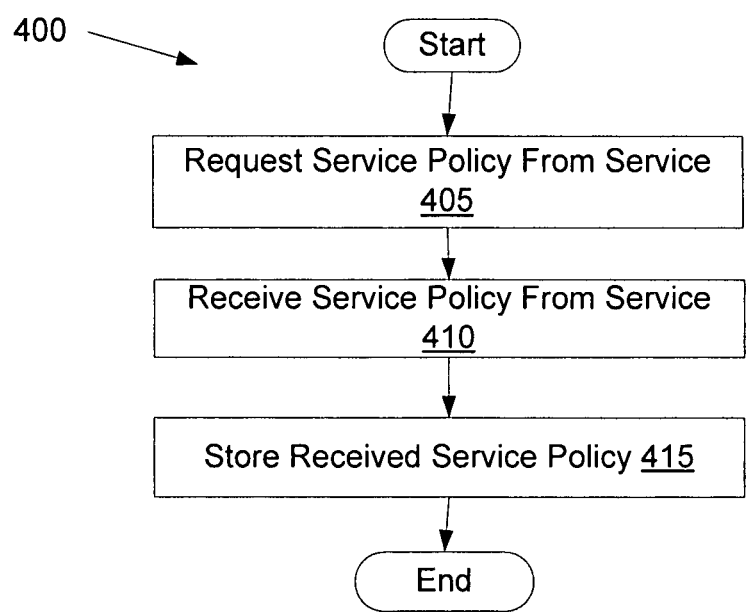
FIG. 4 illustrates a flow diagram of one embodiment for a method of obtaining a service policy and/or additional service information.

FIG. 4 illustrates a flow diagram of one embodiment for a method 400 of obtaining a service policy and/or additional service information. The method may be performed by processing logic that may comprise hardware (e.g., circuitry, dedicated logic, programmable logic, microcode, etc.), software (such as instructions run on a processing device), or a combination thereof. In one embodiment, method 400 is performed by one or more clients of distributed computing system 100 of FIG. 1.

Referring to FIG. 4, method 400 begins with requesting a current service policy and/or additional service information from a service (block 405). The client may know to ask the service about an updated service policy because the service (or the service registry) earlier informed the client that the service is a self-identifying service. The request may be a message sent to the service. At block 410, the current service policy and/or additional service information is received from the service. The service policy may include service capabilities, message format requirements, message context requirements, etc. The additional service information may include service addresses, service descriptions, etc. At block 415, the received service policy and/or additional service information is stored. The stored service policy and/or additional service information may then be used to access the service. Thus, clients are able to directly query services about service policies. This may reduce network traffic (by eliminating a need to request service policies from a service registry), and may minimize or eliminate lag times between when a service updates and when clients can begin using the updated services.

Figure 5:
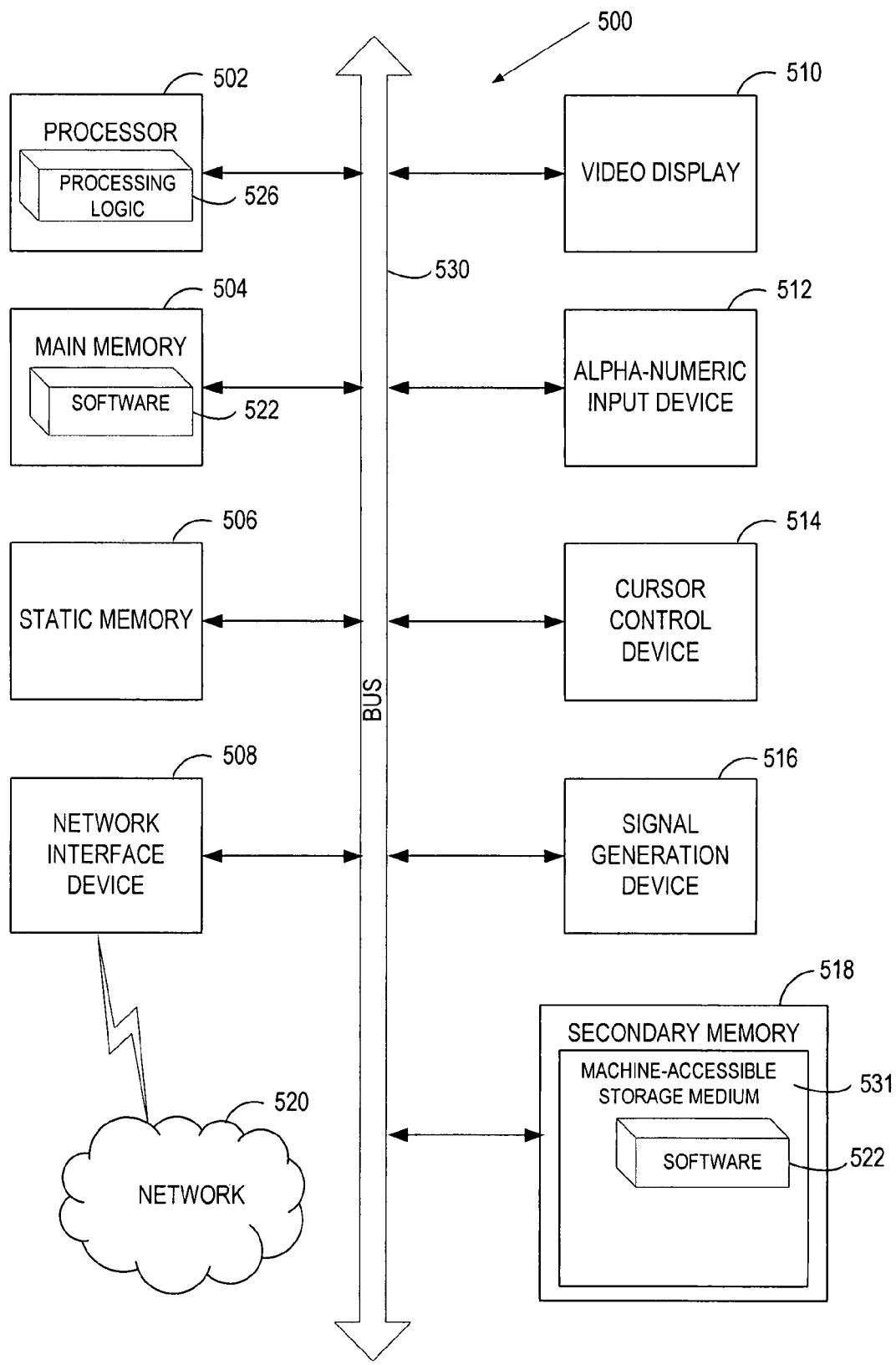
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   providing, by a service registry comprising a processing device, through an enterprise service bus to a client computing machine, an initial service policy for a corresponding service from among multiple interoperable services in a distributed computing environment having a service oriented architecture, wherein the initial service policy comprises messaging conditions to be satisfied by the client computing machine to allow the client computing machine to use the corresponding service;
   modifying, by a service computing system that provides the corresponding service, the initial service policy to create an updated service policy for the corresponding service, wherein modifying comprises modifying the messaging conditions;
   providing, by the service computing system, the updated service policy to the service registry;
   including the updated service policy in the service registry; and
   notifying the client computing machine by at least one of broadcasting a notification of the updated service policy over the distributed computing environment or multicasting a notification of the updated service policy over the distributed computing environment;

receiving a request for the updated service policy from the client; and transmitting, by the service computing system and without use of the service registry that includes the updated service policy, the updated service policy to the client computing machine to enable the client computing machine to use the corresponding service.

2. The method of claim 1, wherein modifying the initial service policy comprises performing at least one of adding a new service capability or removing an existing service capability.

3. The method of claim 1, wherein the updated service policy comprises a service address.

4. The method of claim 3, wherein transmitting the updated service policy is in response to receiving a service policy request from the client computing machine.

5. The method of claim 1, further comprising:

storing client information of the client computing machine, the client information comprising a client address.

6. A method comprising:

requesting, by a client computing machine comprising a processing device, from a service registry through an enterprise service bus, an initial service policy for a corresponding service from among multiple interoperable services in a distributed computing environment having a service oriented architecture, wherein the initial service policy comprises messaging conditions to be satisfied by the client computing machine to allow the client computing machine to use the corresponding service;

receiving the initial service policy from the service registry;

sending, by the client computing device to a service computing system that provides the corresponding service, a service policy request;

receiving, by the client computing device, by at least one of a broadcast of a notification of an updated service policy over the distributed computing environment or a multicast of a notification of the updated service policy over the distributed computing environment;

sending, by the client computing device, a request for the updated service policy;

receiving, by the client computing device from the service computing system and without use of the service registry that includes the updated service policy, the updated service policy for the corresponding service, wherein the updated service policy comprises modifications to the messaging conditions; and storing, by the client computing machine, the updated service policy.

7. The method of claim 6, wherein the updated service policy comprises at least one of an added service capability or a removed service capability.

8. A non-transitory machine readable medium including instructions that, when executed by a processing device, cause the processing device to:

provide, by a service registry comprising the processing device, through an enterprise service bus to a client computing machine, an initial service policy for a corresponding service from among multiple interoperable services in a distributed computing environment having a service oriented architecture, wherein the initial service policy comprises messaging conditions to be satisfied by the client computing machine to allow the client computing machine to use the corresponding service;

modify, by the processing device that provides the corresponding service, the initial service policy to create an updated service policy for the corresponding service, wherein modifying comprises modifying the messaging conditions;

provide, by the service computing system, the updated service policy to the service registry;

include the updated service policy in the service registry;

notify the client computing machine by at least one of broadcasting a notification of the updated service policy over the distributed computing environment or multicasting a notification of the updated service policy over the distributed computing environment;

receive a request for the updated service policy from the client; and transmit, by the processing device and without use of the service registry that includes the updated service policy, the updated service policy to the client computing machine to enable the client computing machine to use the corresponding service.

9. The non-transitory machine readable medium of claim 8, the processing device to perform at least one of adding a new service capability or removing an existing service capability.

10. The non-transitory machine readable medium of claim 8, wherein the updated service policy comprises a service address.

11. The non-transitory machine readable medium of claim 10, the processing device to transmit the updated service policy in response to receiving a service policy request from the client computing machine.

12. The non-transitory machine readable medium of claim 8, the processing device to store client information of the client computing machine, the client information comprising a client address.

13. A non-transitory machine readable medium including instructions that, when executed by a processing device, cause the processing device to:

request, by a client computing machine comprising a processing device, from a service registry through an enterprise service bus, an initial service policy for a corresponding service from among multiple interoperable services in a distributed computing environment having a service oriented architecture, wherein the initial service policy comprises messaging conditions to be satisfied by the client computing machine to allow the client computing machine to use the corresponding service;

receive the initial service policy from the service registry;

send, by the client computing device to a service computing system that provides the corresponding service, a service policy request;

receive, by the client computing device, by at least one of a broadcast of a notification of an updated service policy over the distributed computing environment or a multicast of a notification of the updated service policy over the distributed computing environment;

send, by the client computing device, a request for the updated service policy;

receive, by the client computing device from the service computing system and without use of the service registry that includes the updated service policy, the updated service policy for the corresponding service, wherein the updated service policy comprises modifications to the messaging conditions; and store, by the client computing machine, the updated service policy.

14. The non-transitory machine readable medium of claim 13, wherein the updated service policy comprises at least one of an added service capability or a removed service capability.

15. A system comprising:
- a service registry operatively coupled to an enterprise service bus to provide a client computing machine an initial service policy for a corresponding service from among multiple interoperable services in a distributed computing environment having a service oriented architecture, wherein the initial service policy comprises messaging conditions to be satisfied by the client computing machine to allow the client computing machine to use the corresponding service; and
- a service computing system that provides the corresponding service, wherein the service computing system comprises:
- a memory to store an updated service policy for the corresponding service;
- a processing device operatively coupled to the memory to:
  modify the initial service policy to create the updated service policy for the corresponding service, wherein modifying comprises modifying the messaging conditions;
  notify the client computing machine by at least one of broadcasting a notification of the updated service policy over the distributed computing environment or multicasting the notification of the updated service policy over the distributed computing environment
  receive a request for the updated service policy from the client; and
  transmit the updated service policy to the client computing machine and without use of the service registry that includes the updated service policy to enable the client computing machine to use the corresponding service.

16. The system of claim 15, the processing device to perform at least one of adding a new service capability or removing an existing service capability.

17. The system of claim 15, wherein the updated service policy comprises a service address.

18. The system of claim 17, wherein the client computing machine is to request the updated service policy from the service computing system.

19. The system of claim 15, wherein the memory is to store client information of the client computing machine, the client information comprising a client address.

\* \* \* \* \*